United States Patent
Flisher et al.

(10) Patent No.: US 7,273,895 B2
(45) Date of Patent: Sep. 25, 2007

(54) PROCESS FOR REDUCING RESIDUAL MONOMER CONCENTRATION

(75) Inventors: Anne Flisher, Halifax (GB); Gareth Ian Naylor, Halifax (GB); Lee Raistrick, Bradford (GB)

(73) Assignee: Cibe Specialty Chemicals Water Treatments Ltd., Bradford (GB)

( * ) Notice: Subject to any disclaimer, the term of this patent is extended or adjusted under 35 U.S.C. 154(b) by 0 days.

(21) Appl. No.: 11/269,262

(22) Filed: Nov. 8, 2005

(65) Prior Publication Data

US 2006/0089418 A1  Apr. 27, 2006

Related U.S. Application Data

(60) Continuation of application No. 10/791,013, filed on Mar. 2, 2004, now abandoned, which is a division of application No. 09/890,129, filed as application No. PCT/EP01/00391 on Jan. 15, 2001, now abandoned.

(30) Foreign Application Priority Data

Jan. 28, 2000  (GB) .................................. 0001883.8

(51) Int. Cl.
    C08J 3/28  (2006.01)
(52) U.S. Cl. ............................ 522/42; 522/84; 522/85; 524/827; 524/831
(58) Field of Classification Search .................. 522/42, 522/84, 85; 524/827, 831
    See application file for complete search history.

(56) References Cited

U.S. PATENT DOCUMENTS

| | | | |
|---|---|---|---|
| 4,547,394 A | 10/1985 | Herz et al. | 427/519 |
| 4,762,862 A | 8/1988 | Yada et al. | 522/3 |
| 5,045,573 A | 9/1991 | Kohler et al. | 522/42 |
| 5,185,385 A | 2/1993 | Kanluen et al. | 522/84 |
| 5,756,574 A | 5/1998 | Baumstark et al. | 524/460 |
| 5,800,418 A | 9/1998 | Ahr | 604/268 |
| 5,800,685 A | 9/1998 | Perrault | 204/291 |
| 5,889,073 A | 3/1999 | Zhang et al. | 522/3 |
| 6,262,141 B1 | 7/2001 | Cywar et al. | 522/42 |

FOREIGN PATENT DOCUMENTS

| | | |
|---|---|---|
| DE | 4123889 | 3/1992 |
| EP | 0290814 | 11/1988 |
| WO | 01/25289 | 4/2001 |

OTHER PUBLICATIONS

Derwent Abstr. 1996-236116 for JP 8092307 (1996).

Primary Examiner—Susan Berman
(74) Attorney, Agent, or Firm—Shiela A. Loggins

(57) ABSTRACT

A process of preparing water soluble or water swellable polymer comprising the steps,
  (a) forming an aqueous mixture comprising,
    (i) a water soluble ethylenically unsaturated monomer or blend of monomers and,
    (ii) an ultra violet initiator,
  (b) effecting polymerisation by subjecting the aqueous mixture formed in step (a) to polymerisation conditions to form a polymer of said monomer or monomer blend,
  (c) subjecting the polymer formed in step (b) to ultra violet light radiation, characterised in that the polymerisation step (b) is conducted substantially in the absence of ultra violet radiation. In one preferred aspect the ultra violet initiator is distributed throughout the polymer formed in step (b). In another preferred aspect the step (c) is conducted ultra violet light at an intensity of up to 500 milli Watts/cm$^2$. Also claimed is a method of reducing the residual monomer content in a water soluble or water swellable polymer by subjecting the polymer to ultra violet irradiation in the presence of an ultra violet initiator. The process is particularly suitable for making highly effective water soluble and water swellable polymers useful as flocculants, coagulants, rheology modifiers, dispersants, superabsorbents and binders etc.

13 Claims, No Drawings

PROCESS FOR REDUCING RESIDUAL MONOMER CONCENTRATION

This is a continuation of U.S. application Ser. No. 10/791,013, filed on Mar. 2, 2004 now abandoned, which is a divisional of U.S. application Ser. No. 09/890,129, filed on Aug. 2, 2001 now abandoned, which is the national stage of International Application No. PCT/EP01/00391, filed Jan. 15, 2001.

BACKGROUND OF THE INVENTION

The present invention relates to a process for making water soluble or water swellable polymers, by polymerisation of water soluble ethylenically unsaturated monomer or monomer blend. In particular the invention relates to processes of making said polymers containing low concentrations of residual monomer.

Water soluble and water swellable polymers are used in numerous industrial applications, for instance, flocculants, coagulants, rheology modifiers, dispersants, superabsorbents and binders. Of particular importance are high molecular weight water soluble polymeric flocculants which may be used as retention or drainage aids in paper making or to flocculate sludges such as sewage sludge, waste waters, textile industry effluents red mud from the Bayer Alumina process and suspensions of coal tailings etc.

It is standard practice to prepare water soluble or water swellable polymers by polymerising water soluble monomers using a suitable initiator system. The polymers are usually provided either as a solid particulate product or as a reverse phase dispersion or emulsion. Typically particulate polymers are prepared introducing initiators into an aqueous solution of the monomers and polymerising to form a polymer gel which is then cut into smaller pieces, dried and then ground to the appropriate particle size. Alternatively the polymers are produced as beads by suspension polymerisation or as a water-in-oil emulsion or dispersion by water-in-oil emulsion polymerisation, for example according to a process defined by EP-A-150933, EP-A-102760 or EP-A-126528.

It is known to produce water soluble and water swellable polymers using a variety of initiator systems. For instance it is common practice to polymerise water soluble monomers using redox initiator couples, in which radicals are generated by admixing with the monomer a redox couple which is a reducing agent and an oxidising agent. It is also conventional practice to use either alone or in combination with other initiator systems a thermal initiator, which would include any suitable initiator compound that releases radicals at an elevated temperature. Other initiator systems include photo and radiation induced initiator systems, which require exposure to radiation to release radicals thereby effecting polymerisation. Other initiator systems are well known and well documented in the literature.

Although water soluble and water swellable polymers can be prepared using many of the commercially available initiator systems, it is often difficult to prepare on an industrial scale polymers which have the correct molecular weight in combination with other desired characteristics, such as solubility, degree of absorbency etc. Over the last ten to fifteen years it has also become increasingly important to provide polymers which have extremely low levels of residual free monomer. This is particularly the case for polymers based on acrylamide monomer.

There have been various proposals in the literature for reducing residual free monomer concentrations in polymers, especially polymers of acrylamide. For instance in U.S. Pat. Nos. 4,906,732 and 4,996,251 polyacrylamides are treated with an amidase enzyme which is active towards acrylamide. However, although it was possible to achieve very low levels of free acrylamide, the enzymes proposed in these patents cannot consistently especially at elevated temperatures.

WO-A-97 29136 describes an amidase enzyme which is particularly effective at high temperatures and thus can be applied to the hot polymer gel substantially immediately prior to the drying stage. However, although this enzyme has shown particular advantages over other known amidases, it is still nonetheless difficult to consistently achieve low residual levels of acrylamide on an industrial scale.

Therefore there exists a need to be able to conveniently and consistently provide water soluble or swellable polymers with no or extremely low levels of residual monomer, especially acrylamide monomer.

There also exists a need to achieve this in an industrial scale process and in particular in a process which does not require additional long residence stages in the production process.

SUMMARY OF THE INVENTION

According to one aspect of the invention we provide a process of preparing water soluble or water swellable polymer comprising the steps,
(a) forming an aqueous mixture comprising,
 (i) a water soluble ethylenically unsaturated monomer or blend of monomers and,
 (ii) an ultra violet initiator,
(b) effecting polymerisation by subjecting the aqueous mixture formed in step (a) to polymerisation conditions to form a polymer of said monomer or monomer blend, wherein ultra violet initiator is distributed throughout the polymer,
(c) subjecting the polymer formed in step (b) to ultra violet light radiation, characterised in that the polymerisation step (b) is conducted substantially in the absence of ultra violet radiation.

DETAILED DESCRIPTION OF THE INVENTION

Although higher levels of ultra violet radiation may be employed generally step (c) is conducted using fairly low levels of ultra violet radiation intensity, for instance up to 1 Watt/cm$^2$, usually below 500 milli Watts/cm$^2$.

According to a further aspect of the invention we provide a process of preparing water soluble or water swellable polymer comprising the steps,
(a) forming an aqueous mixture comprising,
 (i) a water soluble ethylenically unsaturated monomer or blend of monomers and,
 (ii) an ultra violet initiator,
(b) effecting polymerisation by subjecting the aqueous mixture formed in step (a) to polymerisation conditions to form a polymer of said monomer or monomer blend,
(c) subjecting the polymer formed in step (b) to ultra violet light radiation at an intensity of up to 500 milli Watts, characterised in that the polymerisation step (b) is conducted substantially in the absence of ultra violet radiation.

The advantage of being able to use relatively low levels of radiation intensity is that there is a reduced risk of inducing denaturing of the polymer. One effect of denaturing the polymer may be undesirable or uncontrolled cross-linking or unacceptable loss of solubility. This may be particularly important when preparing high molecular weight water soluble polymers, where cross-linking and/or loss of solubility could have a deleterious effect on performance. To a certain extent exposure to high levels of ultra violet radiation may be detrimental to deliberately cross-linked polymers in that the additional cross-linking would be uncontrolled and could also lead to a loss of performance. Thus for a cross-linked superabsorbent polymer excessive exposure to ultra-violet cross-linking may result in excessive cross-linking which could impair the absorbency charactersitics.

Thus it is preferred that very low levels of UV radiation intensity are used, for instance up to 100 milli Watts/cm$^2$. Generally the levels of intensity will be above 5 or 10 milli Watts/cm$^2$. Intensities of below 50 milli Watts/cm$^2$ are generally preferred, for instance in the range of 30 to 40 milliWatts/cm$^2$.

The water soluble or water swellable polymer is prepared by polymerisation of a water soluble monomer or water soluble monomer blend. By water soluble we mean that the water soluble monomer or water soluble monomer blend has a solubility in water of at least 5 g in 100 ml of water, measured at 25° C. The polymerisation step (b) may employ conventional polymerisation techniques, provided that these do not result in exposure to ultra violet light.

The polymerisation step (b) may be effected by subjecting the aqueous monomer solution to any conventional polymerisation conditions which do not involve exposure to ultra violet radiation. Desirably this may be achieved by the use of redox initiators and/or thermal initiators. Typically redox initiators include a reducing agent such as sodium sulphite, sulphur dioxide and an oxidising compound such as ammonium persulphate or a suitable peroxy compound, such as tertiary butyl hydroperoxide etc. Redox initiation may employ up to 10,000 ppm (based on weight of monomer) of each component of the redox couple. Preferably though each component of the redox couple is often less than 1000 ppm, typically in the range 1 to 100 ppm, normally in the range 4 to 50 ppm. The ratio of reducing agent to oxidizing agent may be from 10:1 to 1:10, preferably in the range 5:1 to 1:5, more preferably 2:1 to 1:2, for instance around 1:1.

Polymerisation step (b) may also be effected by employing a thermal initiator alone or in combination with other initiator systems, for instance redox initiators. Thermal initiators would include any suitable initiator compound that releases radicals at an elevated temperature, for instance azo compounds, such as azobisisobutyronitrile (AZDN), 4,4'-azobis-(4-cyanovalereic acid) (ACVA). Typically thermal initiators are used in an amount of up 10,000 ppm, based on weight of monomer. In most cases, however, thermal initiators are used in the range 100 to 5,000 ppm preferably 200 to 2,000 ppm, usually around 1,000 ppm.

The water soluble or water swellable polymer prepared according to the process of the present invention may be cationic, anionic, nonionic or amphoteric. It may be substantially linear or alternatively branched or cross-linked. Cross-linked or branched polymers are prepared by incorporating a branching or cross-linking agent into the monomer blend. The cross-linking or branching agent may be for instance a di- or multifunctional material that reacts with functional groups pendant on the polymer chain, for instance multivalent metal ions or amine compounds which can react with pendant carboxylic groups. Preferably, however, the cross-linking or branching agent will be a polyethylenically unsaturated compound, which becomes polymerised into two or more polymer chains. Typically such cross-linking agents include methylene-bis-acrylamide, tetra allyl ammonium chloride, tri-allyl amine and polyethylene glycol di acrylate. The polymers may be highly crosslinked and therefore water insoluble but water swellable. Alternatively the polymer may be water soluble and either substantially linear or slightly branched, for instance prepared using less than 10 ppm cross-linking/branching monomer.

The water soluble or water swellable polymer may be cationic, anionic, amphoteric or non-ionic. Anionic polymers may be formed from one or more ethylenically unsaturated anionic monomers or a blend of one or more anionic monomers with for instance a nonionic monomer, preferably acrylamide. The anionic monomers include acrylic acid, methacrylic acid, maleic acid, crotonic acid, itaconic acid, vinylsulphonic acid, allyl sulphonic acid, 2-acrylamido-2-methylpropane sulphonic acid and salts thereof. A preferred anionic polymer is the copolymer of sodium acrylate with acrylamide.

Cationic polymers may be formed from one or more ethylenically unsaturated cationic monomers optionally with for instance a nonionic monomer, preferably acrylamide. The cationic monomers include dialkylamino alkyl (meth) acrylates, dialkylamino alkyl (meth) acrylamides, including acid addition and quaternary ammonium salts thereof, diallyl dimethyl ammonium chloride. Preferred cationic monomers include the methyl chloride quaternary ammonium salts of dimethylamino ethyl acrylate and dimethyl aminoethyl methacrylate.

Amphoteric polymers include at least one cationic monomer (for example as defined above) and at least one anionic monomer (for example as defined above) optionally with a nonionic monomer, especially acrylamide.

Non-ionic polymers include polymers of any suitable non-ionic monomers, for instance, acrylamide, methacrylamide, N-vinylpyrrolidone and 2-hydroxyethyl acrylate. Preferred non-ionic polymers comprise acrylamide especially acrylamide homopolymers.

Preferably, the water soluble or water swellable polymers comprise acrylamide.

The polymer produced by the process of the present invention may be a relatively low molecular weight polymer, for instance polymerised to a molecular weight below 100,000, for instance 2,000 to 10,000. Preferably however, the polymers are relatively higher molecular weight, for instance at least 100,000, especially at least 500,000. Typically the polymer has a molecular weigh in the range of above 1 million to 20 or 30 million or higher. In general these high molecular weight polymers tend to exhibit high intrinsic viscosities (IV), for instance at least 3 dl/g (measured at various polymer concentrations using standard techniques in 1N NaCl buffered to pH 7.5 at 25° C.). Preferably the polymer has an IV of at least 4 dl/g often at least 7 or 8 dl/g, for instance at least 12 dl/g. In some cases it may be highly desirable for the polymer to have an IV as high as 20 or 30 dl/g or even higher. However especially preferred polymers have an IV in the range 8 to 18 dl/g.

Typically an aqueous solution of water soluble monomer may be polymerised by solution polymerisation to provide an aqueous gel or by reverse phase polymerisation in which an aqueous solution of monomer is suspended in a water immiscible liquid and polymerised to form polymeric beads or alternatively by emulsifying aqueous monomer into an organic liquid and then effecting emulsion polymerisation. Examples of reverse phase polymerisation are given in EP-A-150933, EP-A-102760 or EP-A-126528. Preferably the polymer is prepared by solution polymerisation.

The process of the present invention requires that an aqueous monomer mixture is first formed comprising (i) a water soluble ethylenically unsaturated monomer or blend of monomers and (ii) an ultra violet initiator. In addition the aqueous monomer mixture may also contain other components, for instance redox initiators or thermal initiators or other compounds that may assist with the polymerisation step (b). The aqueous monomer mixture may also comprise other ingredients, for instance chain transfer agents which may be required to regulate the chain length.

The ultra violet initiator (ii) comprised in the aqueous monomer mixture may be any suitable initiator that remains substantially inert during the polymerisation step (b). Therefore the ultra violet initiator would generally be unsuitable if it decomposed during this initial polymerisation step. Therefore it is desirable to choose an ultra violet initiator that is not temperature sensitive at a temperature reached during the initial polymerisation step.

Desirably the ultra violet initiator is distributed homogenously throughout the aqueous monomer mixture, in order that it is evenly distributed throughout the resulting polymer. Preferably the ultra violet initiator is soluble or dispersible in the aqueous monomer or monomer blend.

We have surprisingly found that effective polymers can be produced by the process of the present invention, wherein an aqueous monomer blend which also contains an ultra violet initiator is first subjected to polymerisation in the absence of ultra violet light in which the ultra violet initiator remains substantially inert and then subjecting the polymer to ultra violet radiation.

Preferably the ultra violet initiator is a compound of formula:

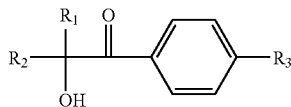

wherein $R_1$ and $R_2$ are each independently $C_{1-3}$ alkyl or together form a $C_{4-8}$ cycloaliphatic ring, $R_3$ is H, $C_{1-2}$ alkyl or —$O(CH_2CH_2)_nOH$ and n is 1-20. An especially preferred ultra violet initiator is the compound defined by the formula,

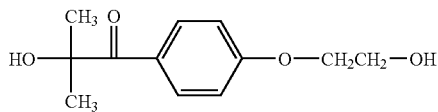

known as 1-[4-(2-Hydroxyethoxy)-phenyl]-2-hydroxy-2-methyl-1-propane-1-one supplied as Irgacure® 2959 photoinitiator by Ciba Specialty Chemicals.

Another especially preferred UV initiator is the compound of the formula,

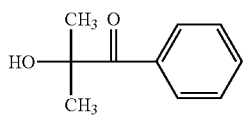

known as 1-phenyl-2-hydroxy-2-methyl-1-propane-1-one supplied as Darocure® 1173 photoinitiator by Ciba Specialty Chemicals.

Desirably the ultra violet initiator is used in an amount up to 10,000 ppm by weight of monomer. However, for economic reasons it is usually preferred not to use more than about 5,000. Suitable results are often obtained when the ultra violet initiator is included in an amount in the range 50 to 3,000 ppm, more preferably 100 to 2,500 ppm, especially 500 to 2,000 ppm.

The process involves the step of subjecting the polymer formed in the polymerisation step (b) to ultra violet radiation. This may be done by passing the formed polymer under ultra violet lamps. For instance the polymer may be passed from the reactor vessel and then irradiated with a suitable dose of ultra violet light and then passed to a drying section. Alternatively the polymer may be exposed to ultra violet radiation in the reactor vessel. Preferably the polymer is subjected to the ultraviolet light in the drying section. Thus in this preferred form of the invention ultra violet lamps are mounted such that the polymer is exposed to ultra violet light whilst inside the drying equipment. More preferably the drying equipment is a fluid bed dryer and the ultra violet lamps are mounted inside the dryer.

It has further surprisingly been found that a water soluble or water swellable polymer in which the amount of residual monomer is below 100 ppm is obtainable by the process of the present invention, including any of the more specific embodiments.

According to a further aspect of the invention we provide a method of reducing the residual monomer content in a water soluble or water swellable polymer by subjecting the polymer to ultra violet irradiation in the presence of an ultra violet initiator. The ultra violet initiator may be applied to the surface of the formed polymer and allowed to coat the surface of the polymer particles and then subjecting the polymer to ultra violet radiation. In a preferred form of this aspect of the invention the ultra violet initiator is actually absorbed into the polymer and is then preferably distributed throughout the polymer before being subjected to irradiation by ultra violet light. Alternatively the water soluble or water swellable polymer may be formed containing the ultra violet initiator distributed throughout the polymer. This may be for instance as a result of carrying out a process in accordance with the first aspect of the invention.

Preferably the method of reducing residual monomer is applied to polymers of acrylamide and said acrylamide polymer contains residual acrylamide monomer. More preferably the polymer of acrylamide is a relatively high molecular weight polymer and has an intrinsic viscosity of at least 4 dl/g, often at least 7 or 8 dl/g, for instance at least 12 dl/g. In some cases it may be highly desirable for the polymer of acrylamide to have an IV as high as 20 or 30 dl/g or even higher. Especially preferred are polymers of acrylamides which have an IV in the range 8 to 18 dl/g.

The ultra violet initiator may be any suitable ultra violet initiator as given herein before. It is preferred that the ultra violet initiator is water soluble or at least water dispersible. Preferably the ultra violet initiator is a compound of formula,

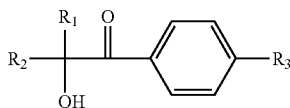

wherein $R_1$ and $R_2$ are each independently $C_{1-3}$ alkyl or together form a $C_{4-8}$ cycloaliphatic ring, $R_3$ is H, $C_{1-2}$ alkyl or —O(CH$_2$CH$_2$)$_n$OH and n is 1-20. Most preferably the ultra violet initiator either a compound of formula,

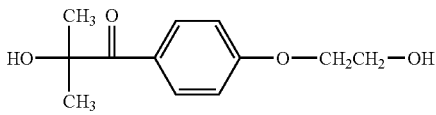

or a compound of formula

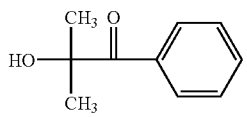

The following examples illustrate the invention, but are not intended to in any way limit the scope of the invention.

EXAMPLES

Test 1

Two tonnes of aqueous monomer mixture is prepared comprising 90% by weight acrylamide and 10% by weight dimethylaminoethyl acrylate methyl chloride quaternary ammonium salt and having a total monomer concentration of about 30%. Nitrogen gas is passed through the aqueous medium in order to remove dissolved oxygen or other volatile reactive species. 4.5 ppm potassium bromate KBrO$_3$ and 9 ppm sodium sulphite Na$_2$SO$_3$ is combined with the aqueous monomer and mixed thoroughly. Polymerisation is allowed to proceed for two hours and the resulting polymer is dried using a fluid bed dryer.

Test 2

This is repeated but subjecting the gel to ultra violet radiation for 20 minutes during the drying process using a UV flood system from Starna using an intensity of 2×10$^{-4}$ µW/cm$^2$/nm. The equivalent irradiation will by obtained using a Solartell Solarscope, model 1 with a multidirectional probe, using an intensity of 25 milli Watts/cm$^2$. These tests are repeated using various amounts of 1-[4-(2-Hydroxy-ethoxy)-phenyl]-2-hydroxy-2-methyl-1-propane-1-one (Irgacure® 2959) in the monomer mixture.

Tests 3 to 6

The solublity, solution viscosity and residual acrylamide monomer are assessed and the results are shown in Table 1.

TABLE 1

| Test | UV initiator (ppm) | UV irradiation (min) | 1% solution viscosity (cP)* | Solubility | Residual Acrylamide (ppm) |
|---|---|---|---|---|---|
| 1 | 0 | 0 | 188 | Good | 881 |
| 2 | 0 | 20 | 199 | Good | 452 |
| 3 | 500 | 0 | 194 | Good | 964 |
| 4 | 500 | 20 | 182 | Fair/Good | 57 |
| 5 | 2000 | 0 | 176 | Fair/good | 960 |
| 6 | 2000 | 20 | 166 | Good | 47 |

*measured using a Mettler viscometer at a shear rate of 30$^{-s}$, measured at 25° C.

Examples 7 to 12

Examples 1 to 6 are repeated but using a an aqueous solution of acrylamide monomer. Viscosity and residual acrylamide concentrations are shown in Table 2.

TABLE 2

| Test | UV initiator (ppm) | UV irradiation (min) | 1% solution viscosity (cP)# | Residual Acrylamide (ppm) |
|---|---|---|---|---|
| 1 | 0 | 0 | 28 | 532 |
| 2 | 0 | 20 | 24 | 412 |
| 3 | 500 | 0 | 26 | 552 |
| 4 | 500 | 20 | 24 | 38 |
| 5 | 2000 | 0 | 28 | 639 |
| 6 | 2000 | 20 | 24 | 32 | measured using a Mettler viscometer at a shear rate of 250$^{-s}$, measured at 25° C.

The invention claimed is:

1. A method of reducing the residual monomer content in a water soluble or water swellable polymer by subjecting the polymer to ultra violet irradiation in the presence of an ultra violet initiator wherein the water soluble or water swellable polymer is not subjected to a comminuting step in which the ultraviolet initiator is applied to the surface of the formed polymer and allowed to coat the surface of the polymer and then subjecting the polymer to ultraviolet radiation.

2. A method according to claim 1 wherein the polymer subjected to ultraviolet radiation is polymerized by reverse phase polymerization, in which an aqueous solution of monomer is suspended in a water immiscible liquid and polymerized to form polymeric beads; or by emulsifying aqueous monomer into an organic liquid and then effecting emulsion polymerization.

3. A method according to claim 1 in which the polymer is a polymer of acrylamide of intrinsic viscosity above 4 dl/g.

4. A method according to claim 1 in which the ultra violet initiator is a compound of formula:

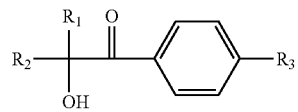

wherein R$_1$ and R$_2$ are each independently C$_{1-3}$ alkyl or together form a C$_{4-8}$ cycloaliphatic ring, R$_3$ is H, C$_{1-2}$ alkyl or —O(CH$_2$CH$_2$)$_n$OH and n is 1-20.

5. A method according to claim 4 in which the ultra violet initiator is a compound of formula:

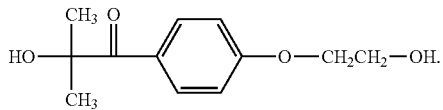

6. A method according to claim 4 in which the ultra violet initiator is a compound of formula:

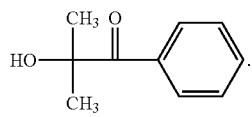

7. A method according to claim 1 in which the ultraviolet initiator is absorbed into the polymer before being subjected to irradiation by ultraviolet light.

8. A method according to claim 1, with the proviso that the water soluble or swellable polymer is not formed in the presence of an ultraviolet initiator in the absence of light.

9. A method according to claim 8 in which the ultraviolet initiator is absorbed into the polymer before being subjected to irradiation by ultraviolet light.

10. A method according to claim 8 in which the polymer is a polymer of acrylamide of intrinsic viscosity above 4 dl/g.

11. A method according to claim 8 in which the ultra violet initiator is a compound of formula:

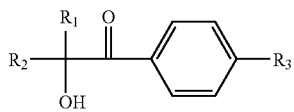

wherein $R_1$ and $R_2$ are each independently $C_{1-3}$ alkyl or together form a $C_{4-8}$ cycloaliphatic ring, $R_3$ is H, $C_{1-2}$ alkyl or —O(CH$_2$CH$_2$)$_n$OH and n is 1-20.

12. A method according to claim 11 in which the ultra violet initiator is a compound of formula:

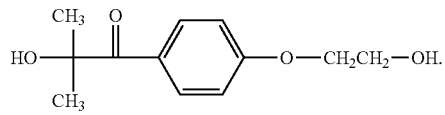

13. A method according to claim 11 in which the ultra violet initiator is a compound of formula:

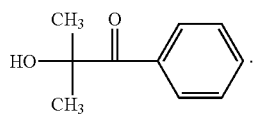

* * * * *